United States Patent [19]

Silvey

[11] 3,971,422
[45] July 27, 1976

[54] METHOD OF TREE FELLING

[76] Inventor: George E. Silvey, 2252 N. 5th St., Springfield, Oreg. 97477

[22] Filed: Oct. 2, 1975

[21] Appl. No.: 618,825

[52] U.S. Cl. ............................ 144/34 B; 144/34 R; 144/309 AC
[51] Int. Cl.² ......................................... A01G 23/08
[58] Field of Search ............... 144/2 N, 34 R, 34 B, 144/309 R, 309 AC, 312; 83/928

[56] References Cited
UNITED STATES PATENTS

| | | | |
|---|---|---|---|
| 90,834 | 6/1869 | Fory | 144/34 R |
| 1,163,155 | 12/1915 | Johnson | 144/34 R |
| 2,006,241 | 6/1935 | Hutchinson | 144/34 B |

Primary Examiner—Othell M. Simpson
Assistant Examiner—W. D. Bray
Attorney, Agent, or Firm—James D. Givnan, Jr.

[57] ABSTRACT

A method for felling large trees including the conventional steps of cutting an undercut and a backcut so as to leave a quantity of intact holding wood intermediate the inner extremes of the undercut and the backcut. Kerfs are cut inwardly into the tree from the undercut surfaces to remove a quantity of holding wood thereby causing calculated weakening of the wood to assure a relatively clean line of severance between the stump and the log butt. The kerfs may be varied in spacing from one another for tree aiming purposes. Side cuts may be made into the holding wood transversely of the kerfs extending inwardly from the undercut for the purpose of imparting additional flexibility to the holding wood to permit controlled felling of the tree to a desired lay as well as to reduce the possibility of forcefully extracting a root from the ground with consequent risks.

4 Claims, 7 Drawing Figures

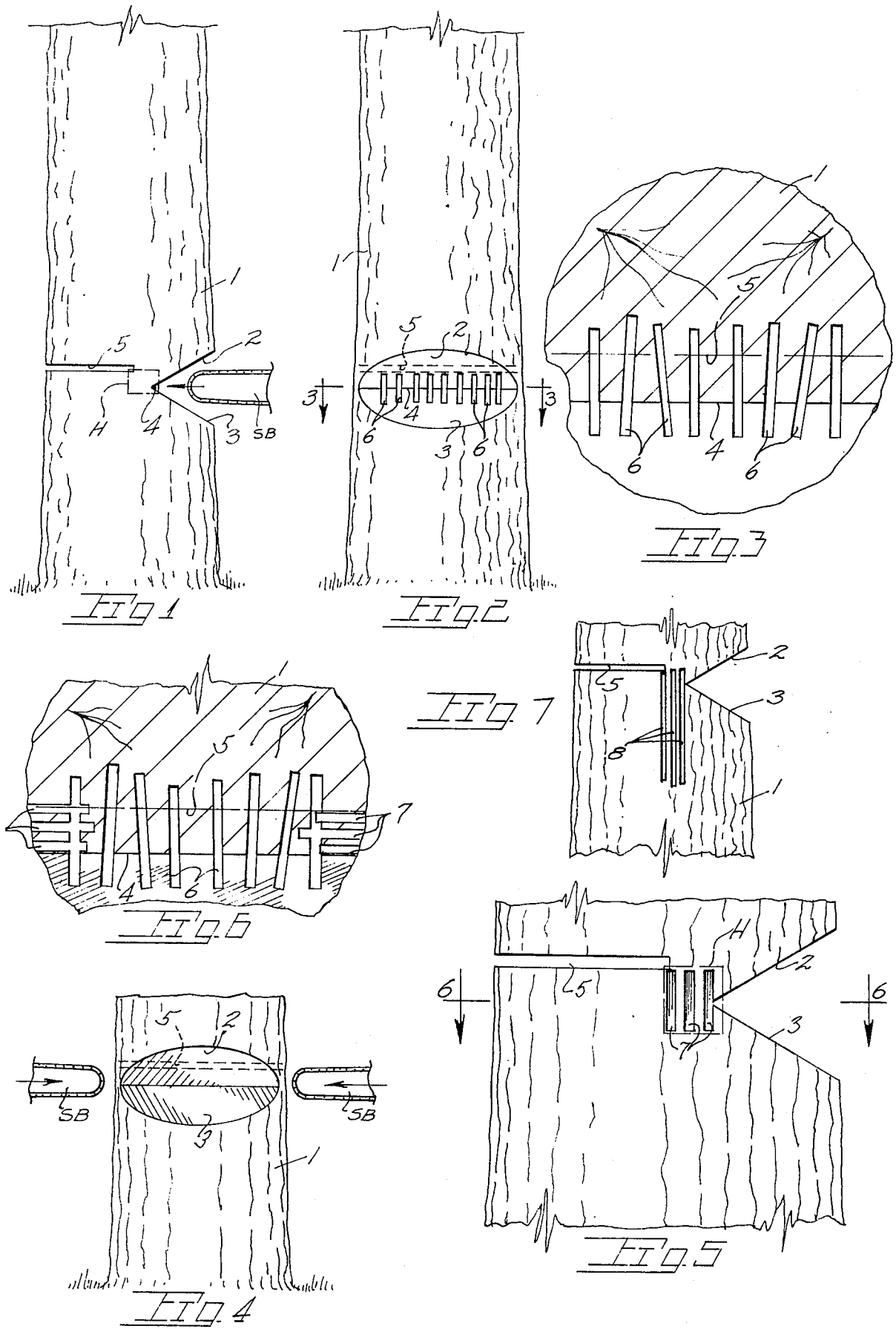

METHOD OF TREE FELLING

BACKGROUND OF THE INVENTION

The present invention relates generally to a method for felling a tree primarily for practice by those in the logging industry.

Briefly, conventional practice in tree felling includes the cutting of an undercut or face cut in a tree trunk transversely to the intended lay of the felled tree. Typically the face cut removes a tree trunk section having a rounded surface with two planar cut surfaces. The undercut extends somewhat less than half way through the tree trunk. A second cut, termed a backcut is made inwardly from the opposite side of the tree and extends inwardly anywhere from one-half to two-thirds of the trunk, diameter terminating in close proximity to the undercut at the time the fall commences. Many variations exist in the tree felling art, all primarily intended to achieve felling of the tree to the desired lay. The holding wood, in the area intermediate the undercut and the backcut, is reduced by further cutting which may be angularly varied relative to the backcut to sever the holding wood so as to assure desired falling.

A common problem encountered by loggers is the felling of a tree without upwardly extending splinters, sometimes several feet in length, being extracted from the butt of the fallen tree. Such splinters leave a corresponding void in the butt of the fallen tree which undesirably reduces the number of board feet derived from the tree.

Attendant the felling of a tree is the risk encountered by loggers in the rapid extraction of a root pulled by a lengthwise extending wood splinter adjacent the tree exterior. A logger standing at the side of the tree stump may be severely injured by a pulled root which may not be discernible until too late.

SUMMARY OF THE PRESENT INVENTION

The present invention is embodied in a method for reducing holding wood of a tree being felled in a manner assuring both wood conservation and logger safety. Further, advantages in hitting the desired lay are realized.

The present method is used in conjunction with certain conventional tree felling steps, i.e., the cutting of a face or undercut and the cutting of a backcut both of which may be performed in the usual manner. The present method includes the additional cutting of multiple, endwise cuts (with respect to the saw blade) into the tree from surfaces exposed by the undercut. The holding wood is thereby reduced in a manner greatly reducing the possibility of wood splinters being extracted from the tree butt during its fall. Such cuts are achieved by endwise advancement of a chain saw bar past the apex of the undercut. The present method may additionally include, what I term, side cuts formed by endwise advancement of the chain saw blade into opposite sides of the tree to diminish the possibility of a root being pulled upwardly during the fall of the tree. The usual risk of injury to the logger from a pulled root is consequently reduced. Such side cuts add a degree of resiliency to the tree being felled to enable a greater degree of lean before the fall commences and consequently better guidance.

BRIEF DESCRIPTION OF THE DRAWING

In the accompanying drawing:

FIG. 1 is an elevational view of a tree being felled taken at 90° to the intended line of fall;

FIG. 2 is a view of the tree rotated through ninety degrees from its FIG. 1 position and subsequent to the forming of multiple holding wood cuts;

FIG. 3 is a horizontal sectional view taken downwardly along line 3—3 of FIG. 2;

FIG. 4 is a view similar to FIG. 2 preparatory to the formation of endwise saw kerfs formed by the end of a chain saw;

FIG. 5 is an enlarged view of the tree trunk section rotated through ninety degrees with the side cuts formed therein;

FIG. 6 is a horizontal sectional view taken along line 6—6 of FIG. 5 showing a tree with side cuts formed by endwise insertion of a chain saw bar; and FIG. 7 is a view similar to FIG. 5 with the side cuts extended for the purpose of increasing tree flexibility.

DESCRIPTION OF THE PREFERRED EMBODIMENTS

With continuing reference to the accompanying drawing wherein applied reference numerals indicate parts similarly identified in the following specification, the reference numeral 1 indicates a trunk of a tree to be logged. Ordinarily, such trees in the Western part of the United States of America, will range up to several feet in diameter.

Customary tree felling includes the formation of an undercut defined by sawn surfaces 2 and 3 terminating inwardly in a transversely extending apex 4. The configuration of the undercut, sometimes called the face cut, may vary e.g., the same may be partially defined by a horizontal cut with the remaining cut being upwardly or downwardly inclined. The undercut normally extends into the tree a distance equal to one third of the tree diameter.

A backcut is indicated at 5 which extends into the tree approximately one half the tree diameter. Both the undercut and backcut are subject to many variations to best suit the felled task at hand.

That portion of the tree remaining intact and supporting the tree is termed the holding wood and comprises a trunk portion located, generally speaking, intermediate the apex of the undercut and the inner terminus of the backcut. Such a transversely extending area is indicated at H and extends chordally through the trunk.

Felling of the tree is customarily achieved by a gradual severance of the holding wood H by advancing the back cut 5 in a selective manner causing the tree to fall to a desired lay. The present method may be used in conjunction with jacks if desired.

The present method importantly includes a series of cuts or kerfs 6 formed in the tree trunk and extending inwardly from the undercut into the holding wood. Such kerfs are formed by the advancement of the upright chain saw bar endwise into the undercut. The amount of holding wood is accordingly diminished in a manner assuring a relatively clean break between the log and stump without splinters of wood being extracted from the tree base as it falls. As aforesaid, any void left in the tree butt by splinters extracted during the fall results in the loss of board feet when the log is sawn into lumber.

The spacing, placement and direction of the kerfs 6 will vary with each falling task but in each case the multiple cuts made will diminish the holding wood so as to ultimately cause fracturing of the holding wood between the upper and lower edges of each kerf thereby obviating the above mentioned splinters. The kerf 6 may be parallel to one another or otherwise as such is not deemed critical. For the purpose of felling the tree to an intended lay, the number of kerfs 6 may be varied both in number and in spacing so as to asymetrically weaken the holding wood for aiming of tree toward a desired lay.

In FIGS. 5 and 6 I show further steps which may be included in the present method to reduce the chances of pulling a tree root which sometimes occurs with resulting injuries. Kerfs at 7, termed side kerfs or side cuts, are cut into the tree trunk adjacent the ends of the undercut apex and transversely to the initial cuts 6. Preferably kerfs 7 extend inwardly a distance adequate to communicate with at least the outermost cuts 7 as viewed in FIG. 6. A further advantage to the formation of side cuts is the enhancement of the tree's flexibility as shown in FIG. 7 where a series of side cuts 8 are extended downwardly longitudinally of the tree side permitting the tree to lean to a greater degree prior to commencing its fall. Wedges and/or jacks may be inserted for precise guidance of the tree.

While I have shown but a few embodiments of the invention it will be apparent to those skilled in the art that the invention may be embodied still otherwise without departing from the spirit and scope of the invention.

Having thus described the invention what is desired to be secured under a Letters Patent is:

1. The method of felling a tree including the steps of, cutting an undercut in the tree trunk, said undercut defined by planar sawn surfaces,
cutting a back cut terminating in an offset manner from the inner extremity of said undercut,
cutting multiple kerfs extending inwardly from said undercut into the tree holding wood located intermediate the inner extremities of the undercut and back cut so as to cause separation of the tree and stump to occur within the holding wood during felling of the tree and thereby avoid extraction of wood splinters from the butt of the tree being felled with a consequent loss of board feet of lumber, and
advancing the back cut into the holding wood until the tree commences falling.

2. The method claimed in claim 1 additionally including the cutting of additional saw kerfs in the holding wood in a direction generally transverse to the direction of the first mentioned kerfs prior to advancing the back cut.

3. The method claimed in claim 2 wherein said additional kerfs are cut to a depth so as to communicate with at least some of said first mentioned kerfs.

4. The method claimed in claim 3 wherein the step of cutting additional saw kerfs includes the advancement of the saw downwardly along the tree to form a series of elongate kerfs to enhance tree flexibility enabling better guidance of the tree being felled.

* * * * *